US 6,636,588 B2

(12) United States Patent
Kimura et al.

(10) Patent No.: US 6,636,588 B2
(45) Date of Patent: Oct. 21, 2003

(54) INTELLIGENT NETWORK SYSTEM

(75) Inventors: Shouichi Kimura, Yokohama (JP); Yayoi Itoh, Yokohama (JP); Kiyoshi Oshimi, Yokohama (JP); Nobuaki Kitazumi, Yokohama (JP); Yoshikazu Takeda, Yokohama (JP); Michiko Osawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/473,921

(22) Filed: Dec. 28, 1999

(65) Prior Publication Data

US 2003/0174820 A1 Sep. 18, 2003

(30) Foreign Application Priority Data

Dec. 28, 1998 (JP) ............................................ 10-372136

(51) Int. Cl.⁷ ............................................. H04M 15/00
(52) U.S. Cl. ........................... 379/112.04; 379/112.01; 379/112.1; 379/133; 379/221.09; 370/229
(58) Field of Search .......................... 379/111, 112.01, 379/112.06, 114.05, 114.28, 114.29, 130, 133, 201.01, 201.02, 201.12, 221.09, 230; 370/229, 230, 235, 236

(56) References Cited

U.S. PATENT DOCUMENTS

| | | | | |
|---|---|---|---|---|
| 5,475,737 A | * | 12/1995 | Garner et al. ............ | 379/88.26 |
| 5,631,948 A | * | 5/1997 | Bartholomew et al. .. | 379/88.18 |
| 5,661,782 A | * | 8/1997 | Bartholomew et al. .. | 379/88.18 |
| 5,680,442 A | * | 10/1997 | Bartholomew et al. .. | 379/88.26 |
| 5,771,279 A | * | 6/1998 | Cheston et al. .......... | 379/93.17 |
| 5,812,639 A | * | 9/1998 | Bartholomew et al. ..... | 370/352 |
| 5,825,860 A | * | 10/1998 | Moharram ............. | 379/112.01 |
| 5,898,672 A | * | 4/1999 | Ginzboorg ................. | 370/236 |
| 5,915,008 A | * | 6/1999 | Dulman ................. | 379/221.08 |
| 6,011,837 A | * | 1/2000 | Malik ......................... | 379/112 |
| 6,064,950 A | * | 5/2000 | Lehtinen ..................... | 702/186 |
| 6,104,796 A | * | 8/2000 | Kasrai ........................ | 379/201 |
| 6,134,315 A | * | 10/2000 | Galvin ....................... | 379/219 |
| 6,215,858 B1 | * | 4/2001 | Bartholomew et al. .. | 379/88.17 |
| 6,236,998 B1 | * | 5/2001 | Lehtinen ..................... | 707/10 |
| 6,282,281 B1 | * | 8/2001 | Low ........................... | 379/230 |
| 6,285,745 B1 | * | 9/2001 | Bartholomew et al. .. | 379/88.17 |
| 6,289,090 B1 | * | 9/2001 | Tessler et al. ......... | 379/207.02 |
| 6,298,130 B1 | * | 10/2001 | Galvin ....................... | 379/219 |
| 6,393,116 B1 | * | 5/2002 | Kaiser et al. ........... | 379/201.12 |
| 6,393,481 B1 | * | 5/2002 | Deo et al. ................... | 709/224 |
| 6,411,697 B1 | * | 6/2002 | Creamer et al. ........ | 379/201.12 |
| 6,415,027 B1 | * | 7/2002 | Malik ..................... | 379/221.01 |
| 6,425,005 B1 | * | 7/2002 | Dugan et al. ............... | 709/223 |
| 6,473,402 B1 | * | 10/2002 | Moharram .................. | 370/236 |

FOREIGN PATENT DOCUMENTS

| | | |
|---|---|---|
| JP | 6-125578 | 5/1994 |
| JP | 8-317063 | 11/1996 |
| JP | 9-8907 | 1/1997 |

* cited by examiner

*Primary Examiner*—Binh Tieu
(74) *Attorney, Agent, or Firm*—Katten Muchin Zavis Rosenman

(57) ABSTRACT

In an intelligent network system, a service subscriber can remotely execute a procedure, such as a registration or a change of the contents of service, which is performed by an operator in the conventional system, through an external terminal by him or her. The intelligent network system includes a service control point that controls services and provides a database storing data relating to a service subscriber; a service management system, which monitors load on the service control point, stores and manages data relating to the service subscriber; external terminals owned by the service subscriber; and a remote access management system, which is interfaced with the external terminal. The service management system updates and records the data of the updated subscriber's service, which is transmitted through the remote access management system, in the database of the service control point, when the service control point does not over-load.

15 Claims, 17 Drawing Sheets

FIG. 6A

Example of screen of setting a cycle of executing updating process

```
Automatic scanning

Input request number of cyclic span

1:  5 minutes

2: 10 minutes

3: 15 minutes

4: 20 minutes

5: 30 minutes

6: 1 hour type in ( 1 - 6 , c (Cancel) )

Example of screen of setting a start time of cyclic process

```
Automatic Scanning

Input executing start time
Start time
type in  (Start time ?? :  00  (?? = 0-23),   a (All time),  c (Cancel) )
→
```

FIG. 6C

Example of screen of setting an end time of cyclic process

```
Automatic Scanning

Input executing end time
End time
type in  (End time ?? :  59  (?? = 0-23),   c (Cancel) )
→
```

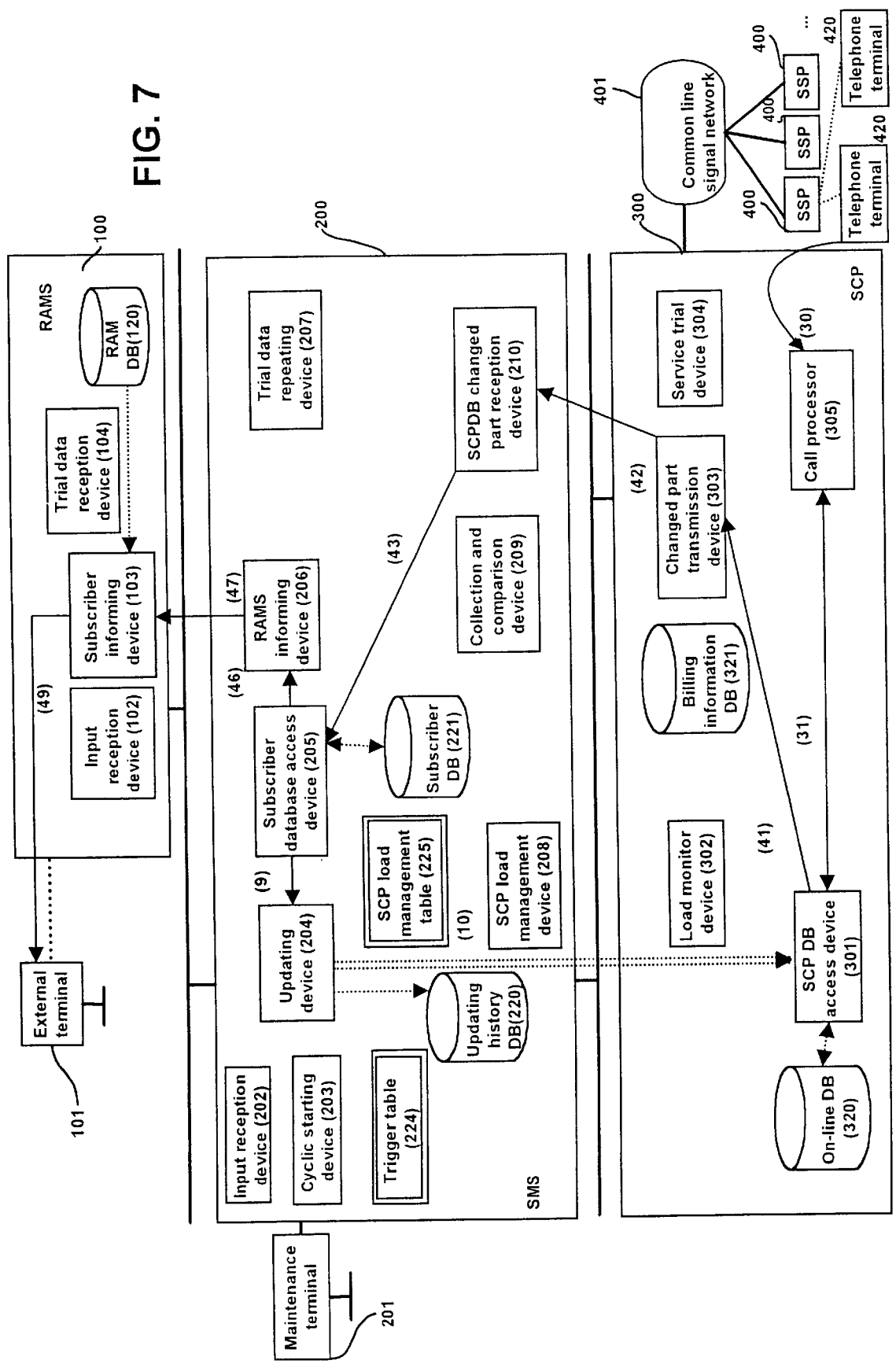

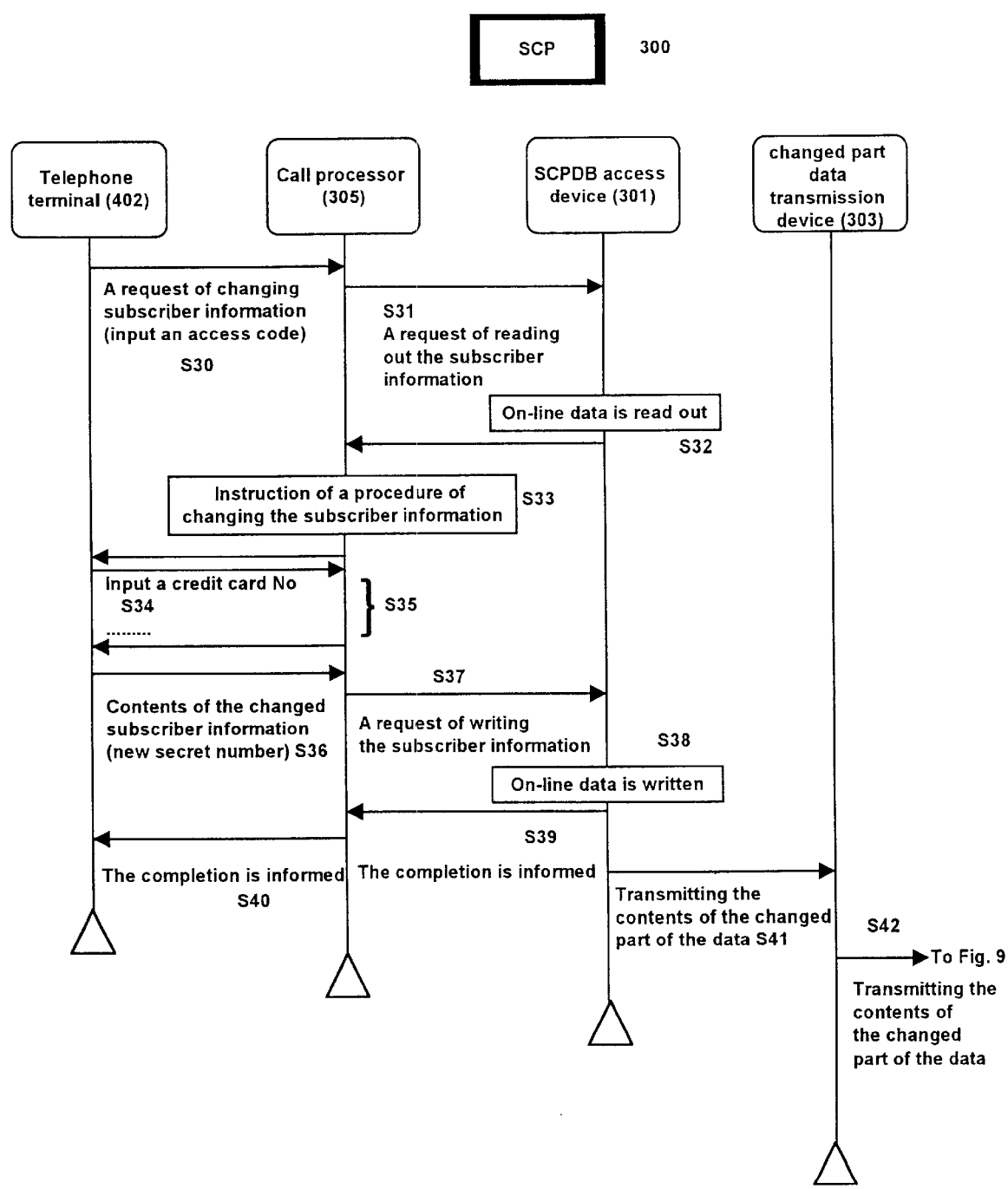

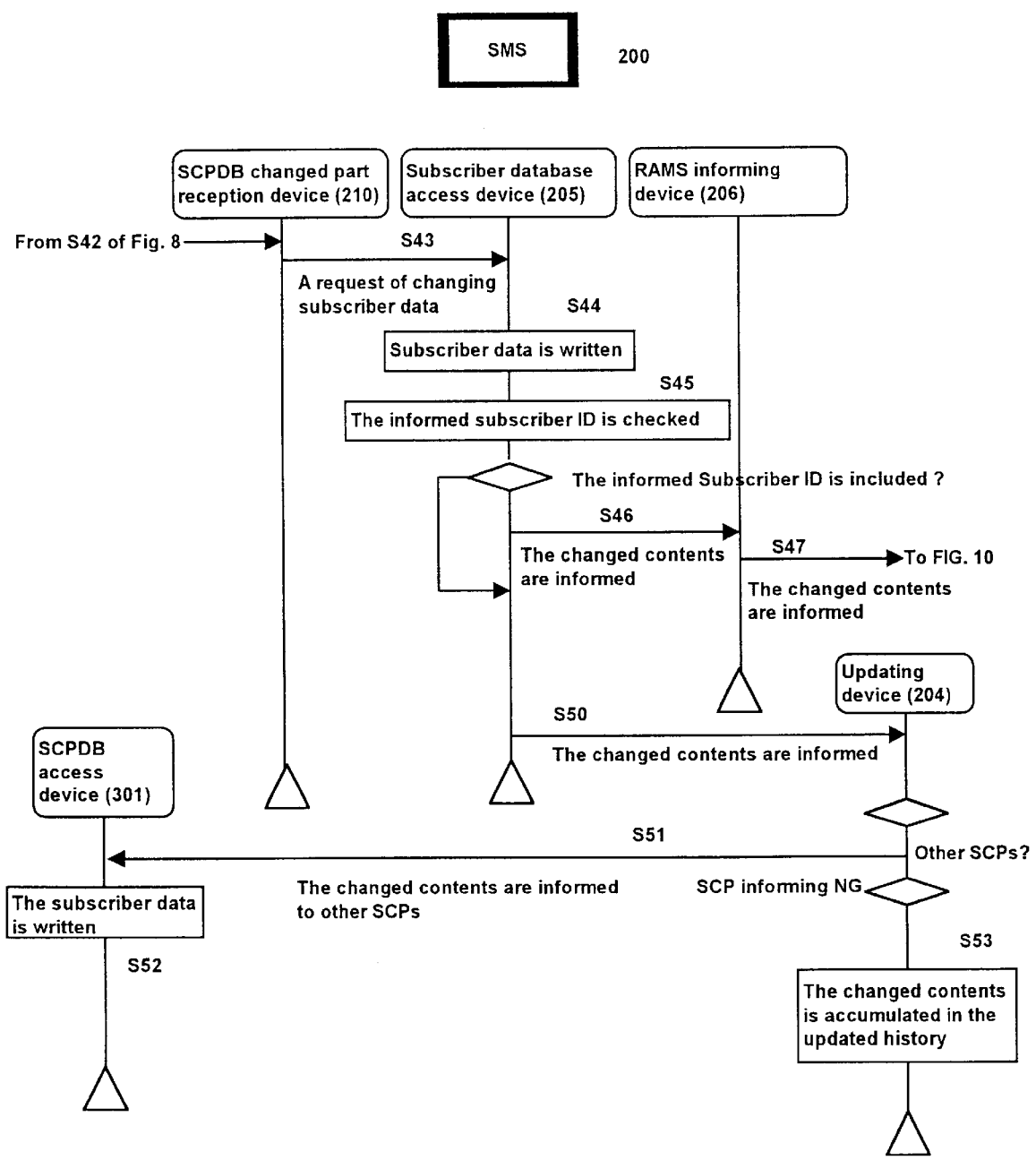

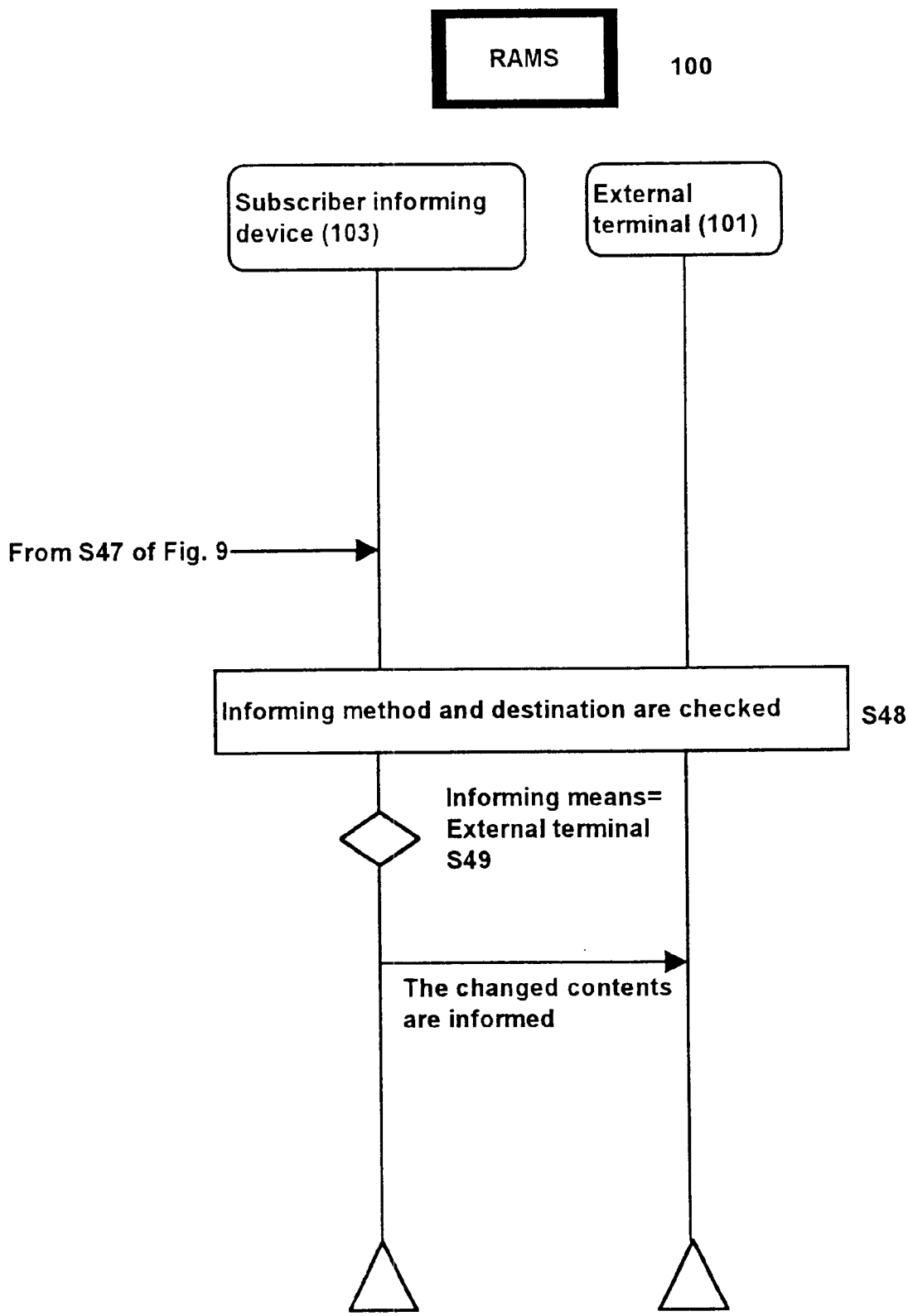

FIG. 14

31 bit                                         0

| Field | Bits |
|---|---|
| Message type | 0 |
| Event type | 1, 2 |
| Host name | 3, 4 |
| Host address | 5, 6, 7 |
| Service name | 8, 9, 10 |
| Expanded section | 11 ... 50 |

- Message type   : ID of this message (start, end, suspend, continue)
- Event type      : Event ID from the sender (structural ID of the expanded section)
- Host name     : Host name of the sender
- Host address   : Host address of the sender
- Service name   : the requested service name
- Expanded section   : Expanded section

INTELLIGENT NETWORK SYSTEM

BACKGROUND OF THE INVENTION

1. Field of the Invention

The present invention relates to an intelligent network system. More particularly, it relates to an intelligent network system and an updating method for updating service subscriber data, which subscribers who receive services can edit by them.

2. Description of the Related Art

An intelligent network has been developed and widely used, which provides a telephone service such as a free dial service or credit service.

In the intelligent network, an operator having many experiences and full knowledge is required to operate and manage the database of subscribers at an operation center of the network system.

Subscribers can perform only brief operations through a telephone by them such as registration of their personal identification numbers for credit telephone. However, when a subscriber wants to register and change the data relating to his or her own services, the subscriber should request to the operation center, where the more complex registration is required. Only the operator at the operation center can perform operations for such the request, according to the structure and state of the system.

Therefore, there are most cases that it takes too much time to the requested contents are really reflected to the system. There are the other cases that the data should be subsequently changed and used according to types of services. However, it also takes too much time to reflect the changed contents, thus it makes services for the subscriber become lower.

Diversification of recent services or changes on customer support system, such as a 24-hour support system, makes a demand increase that the subscriber does not leave the operator with registering and changing the subscriber's own data, but does as the subscriber like anytime he or her wants.

A marked tendency such the above-described demand is seen lately with the spread of Internet. In this case, all subscribers do not know well about the intelligent network. If the same registration and changing methods as those for the operators in the operation center are only provided for the subscribers, the following problems will occur:

One is that the subscriber can not accurately judge the condition of system that the subscriber can not use well, thus causing a possibility to give a bad influence on the system because of the subscriber's inaccurate process.

Second is that there is another possibility that the subscriber who does not have enough experiences inputs mistaken data and does not find out the mistaken data, and then, the service is continuously used at the state.

SUMMARY OF THE INVENTION

Accordingly, it is an object of the present invention to provide an intelligent network system wherein the above-described problems can be avoided.

It is another object of the present invention to provide an intelligent network system to which the subscriber who does not know the system fully can perform a remote access, for example, internet access, through an external terminal.

It is further object of the present invention to provide an intelligent network system, in which the subscriber can easily register and change his or her own data by him or her without problems, and a service data updating method for the service subscriber.

To achieve the above-described objects according to the present invention, an intelligent network system includes a service control point having a database storing data relating to service subscribers and controlling services to be provided to the service subscribers; a service management system monitoring load on the service control point, and maintaining and managing the data relating to the service subscribers; an external terminal owned by the service subscribers; and a remote access management system interfacing with the external terminals.

When the service control point is not over-loaded, the service management system records updated data, of the service subscribers, transmitted through the remote access management system in the database at the service control point.

In one mode of the present invention, the service management system includes a means for setting cyclic information for updating and recording the database of the service control point, updates and records the database according to the set cyclic information.

In the other mode of the present invention, the cyclic information for updating and recording the database can be set by a system operator from a maintenance terminal connected to the service management system in the service management system.

Additionally, in one mode of the present invention, the service management system includes a means for informing the result of the updated and recorded database of the service control point through the remote access management system to the external terminal owned by the service subscriber.

Further, in the other mode of the present invention, the service management system has a means for informing the contents of the changed database through the remote access management system to the external terminal owned by the service subscriber, when the database is changed from a telephone terminal connected through a common line signal network to the service control point.

In addition, in one mode of the present invention, plurals subscriber control points are provided according to the number of subscribers.

Alternatively, in one mode of the present invention, the remote access management system includes a trial data reception means, the service management system includes a trial data repeating device, and the service control point includes a service trial device, wherein the trial data reception mean receives a request of trying the service for the service subscriber from the external terminal, executes the service corresponding to the request of trying the service subscriber from the service trial device at the service control point and informs the result of executing the service through the trial data repeating device to the external terminal of the service subscriber.

Further, in one mode of the present invention, static information collected at the service executed and conditions of informing billing information can be set by the subscriber as the updated data for the service subscriber and the service management system informs the static information and the billing information based on the set condition.

In addition, in one mode of the present invention, the service management system controls not to charge for services on the service subscriber requested via the telephone terminal.

Further, features of the present invention will become clear by the description for explaining embodiments according to the attached drawings.

BRIEF DESCRIPTION OF THE PRESENT INVENTION

FIGS. 6A, 6B and 6C show examples of screens for registering cyclic information of executing an updating process.

FIG. 7 is an explanatory diagram of another embodiment according to the present invention.

FIG. 8 is a flowchart indicating an operation at service control point 300.

FIG. 9 is a flowchart indicating an operation at service management system 200.

FIG. 10 is a flowchart indicating an operation at remote access management system 100.

Figure 11:
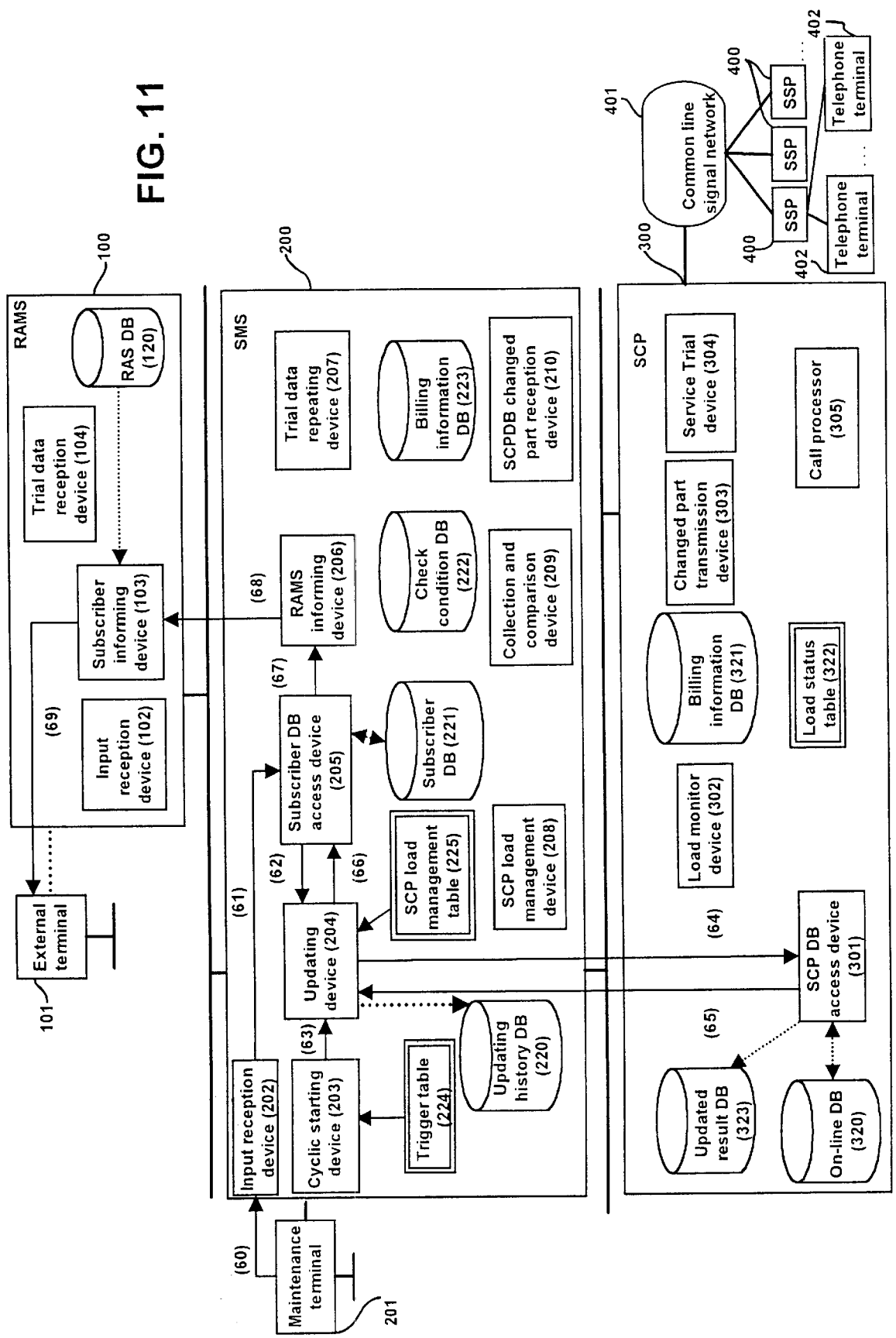

FIG. 11 further shows a structure of still another embodiment, when an operator in a telephone station updates a subscriber database.

Figure 12:
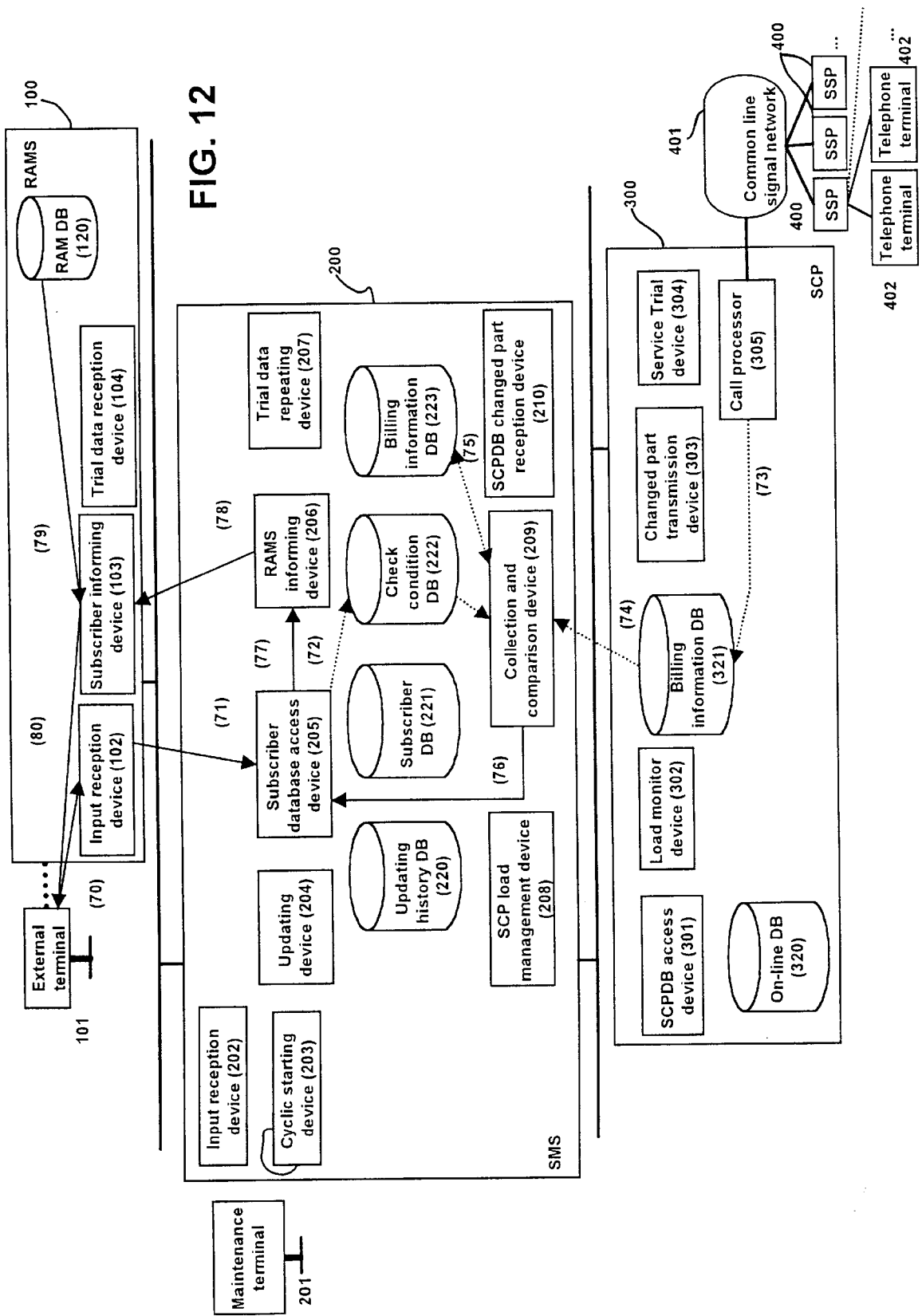

FIG. 12 shows a further embodiment of the present invention.

Figure 13:
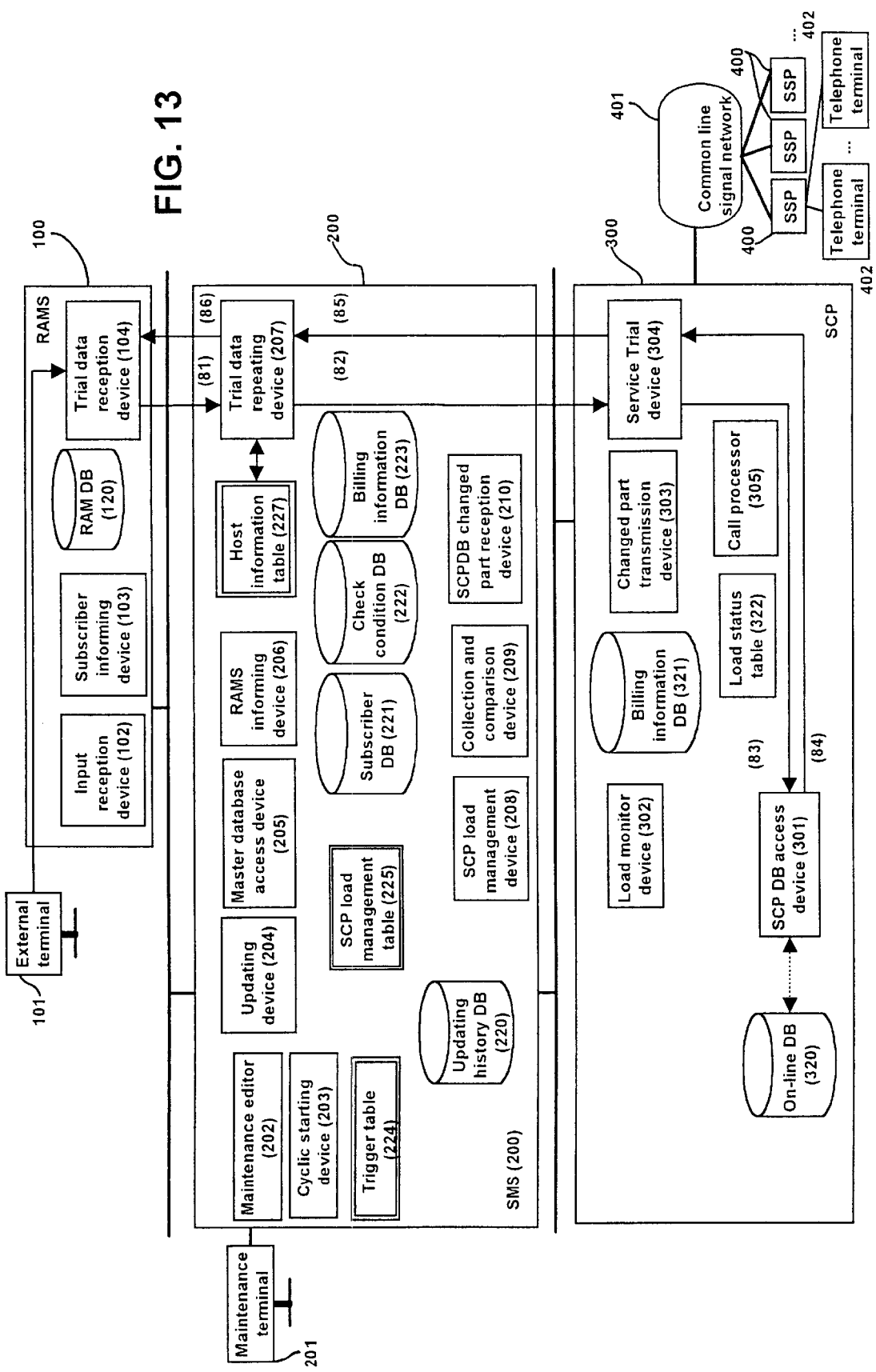

FIG. 13 further shows a still further embodiment of the present invention.

FIG. 14 shows an example of a message structure of service trial information.

Figure 15:
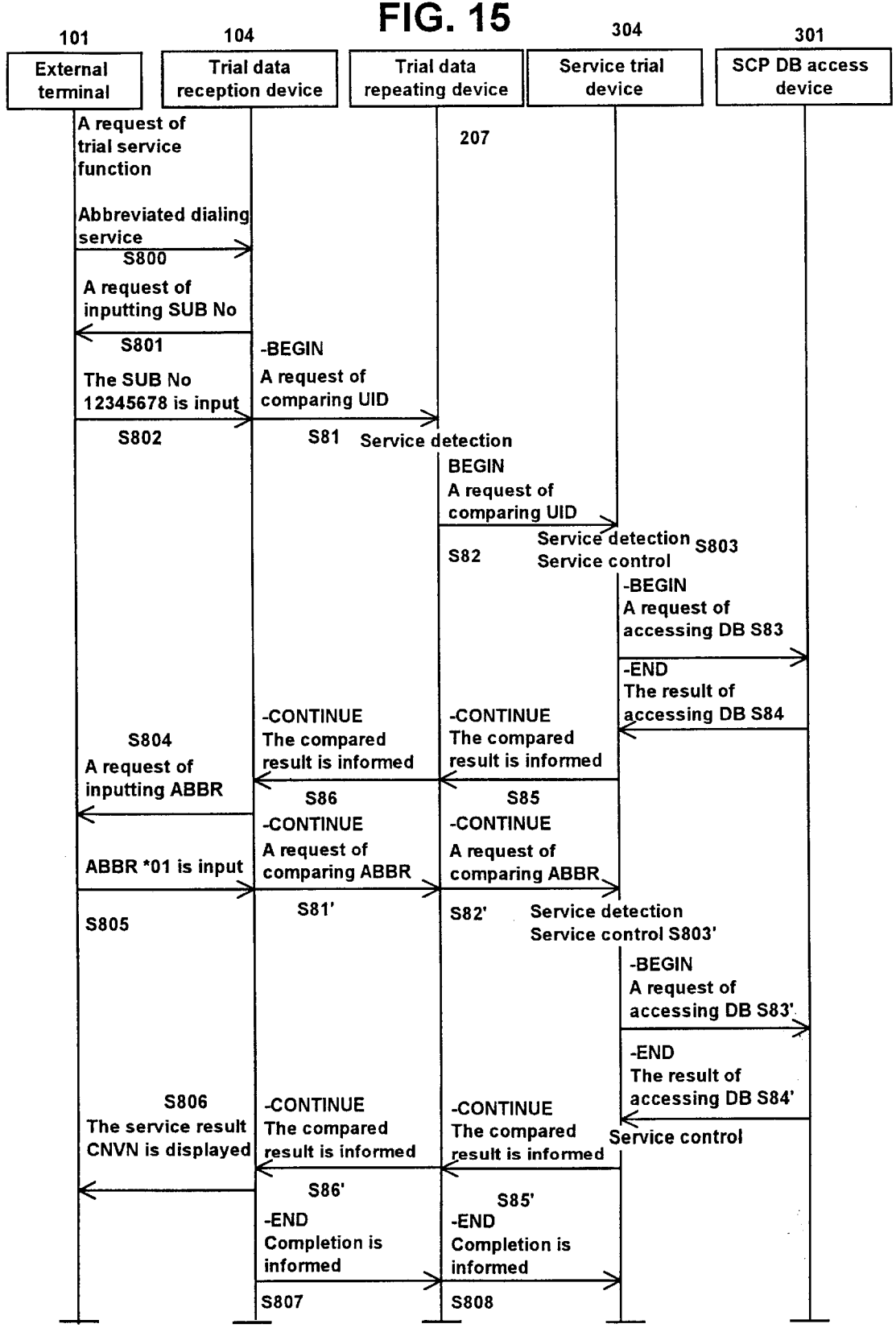

FIG. 15 is a sequential flowchart as an operation of the embodiment shown in FIG. 13.

Figure 16:
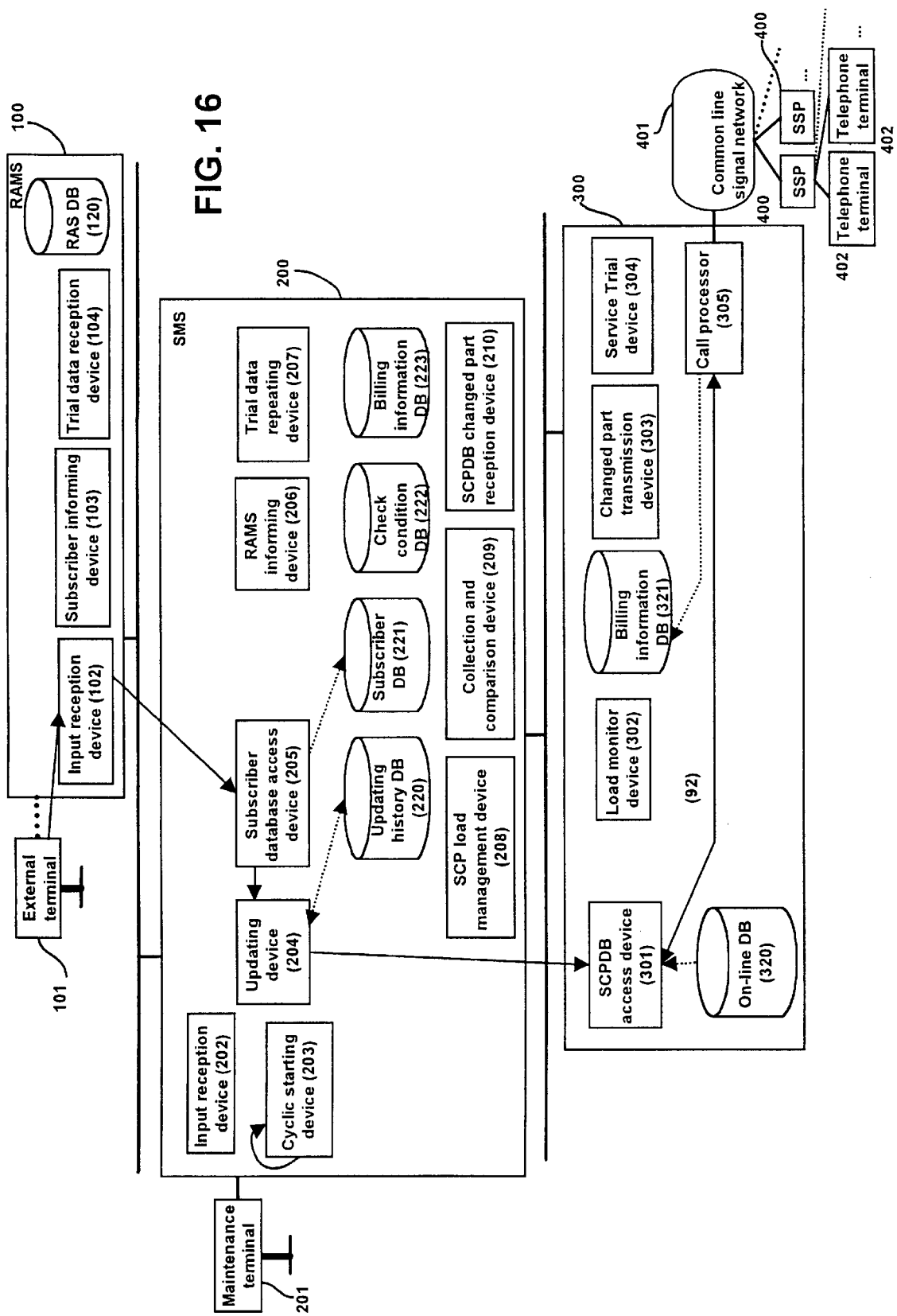

FIG. 16 is an explanatory diagram when the subscriber data is edited in the first basic structure.

Figure 17:
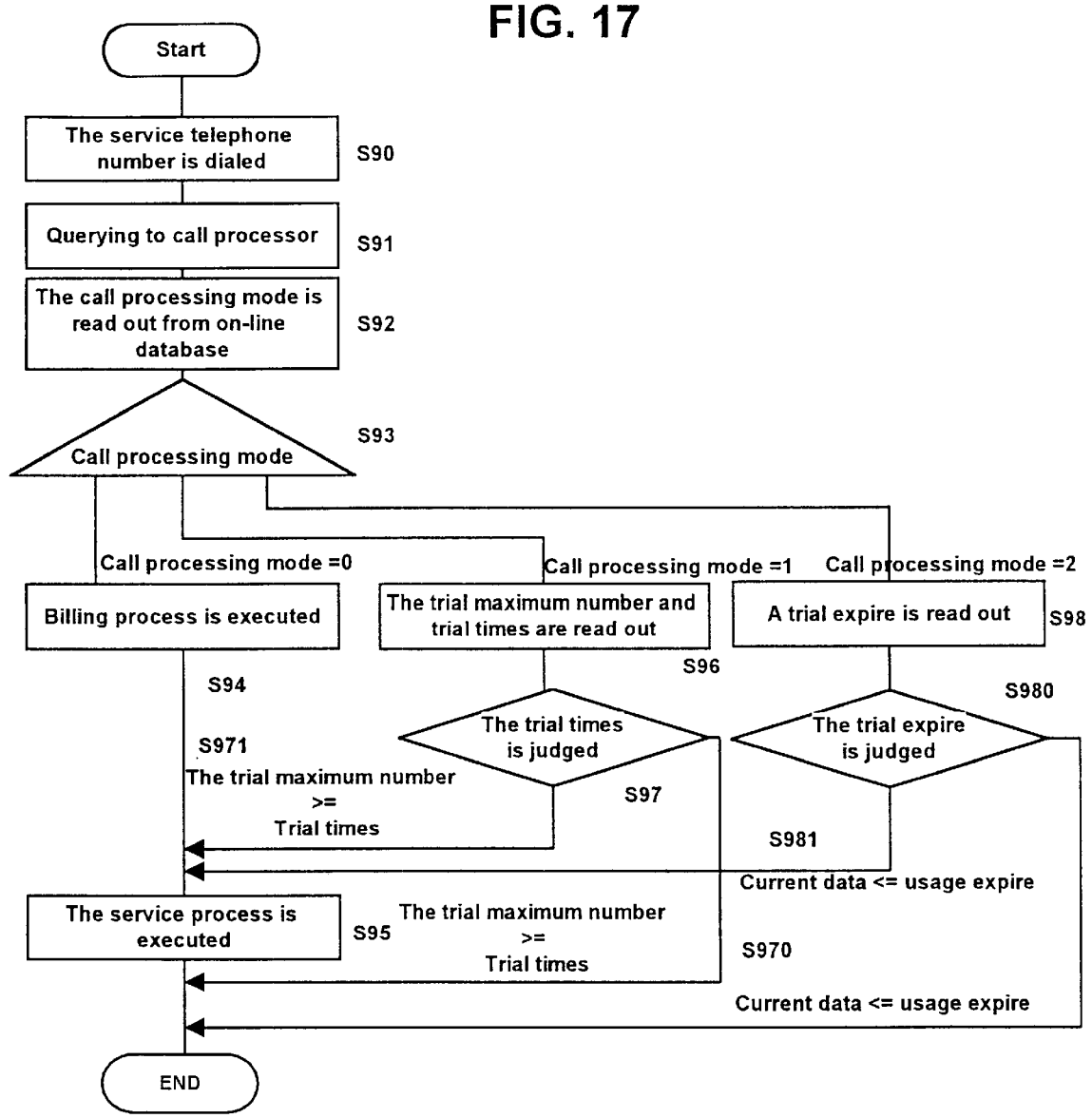

FIG. 17 is an operational flowchart corresponding to the structure shown in FIG. 16.

DESCRIPTION OF THE PREFERRED EMBODIMENTS

Hereinafter, preferred embodiments of the present invention will be now described in reference to the drawings. Throughout the attached drawings, the same reference numerals and symbols are used to denote corresponding or identical components.

Figure 1:
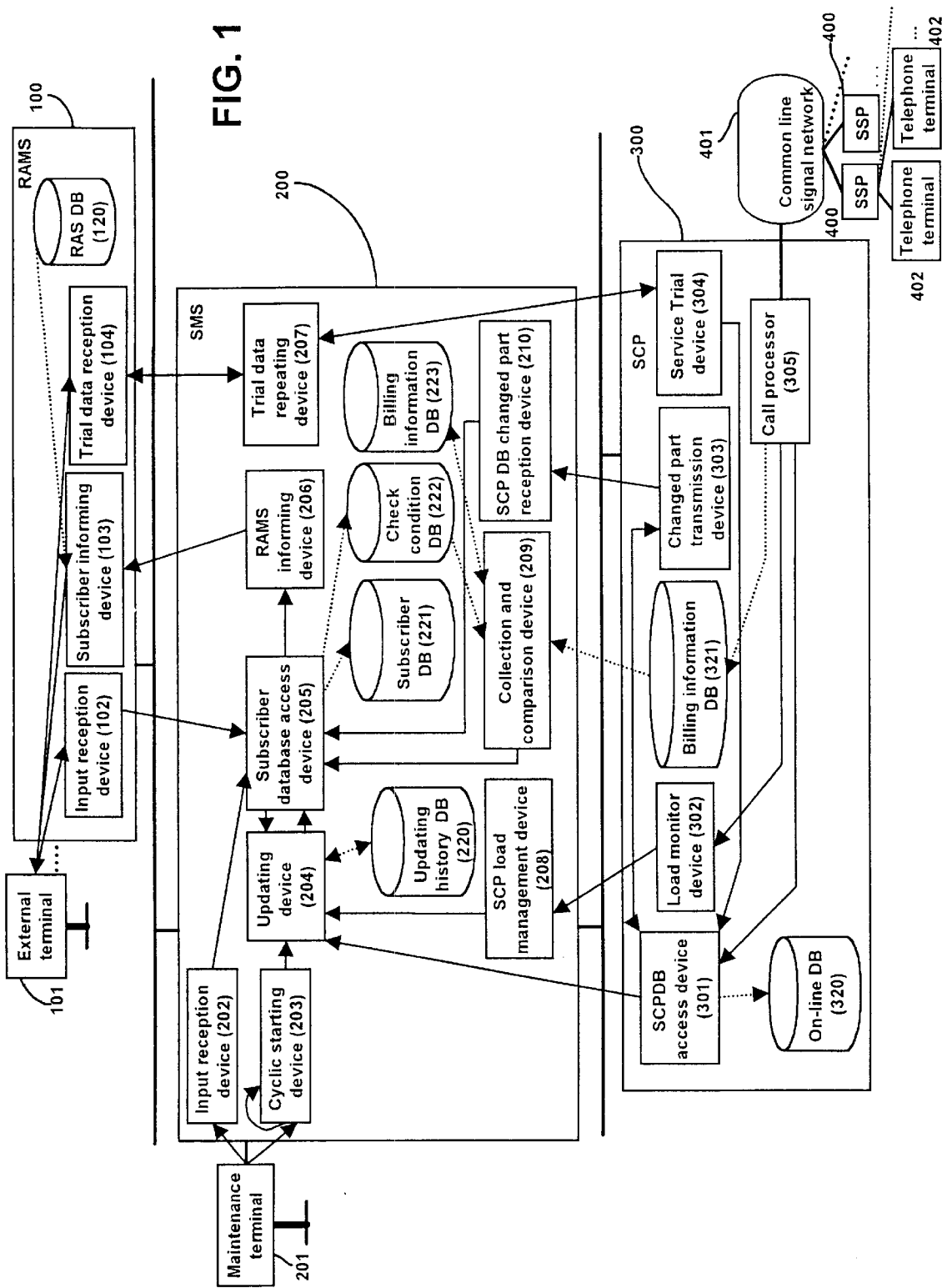
FIG. 1 is a block diagram for explaining a basic structure of a network system according to the present invention.

FIG. 1 is a block diagram for explaining a basic structure of a network system according to the present invention.

The network system according to the present invention is characterized in having an external terminal 101, such as a personal computer owned by a service subscriber, and a remote access management system (RAMS) 100.

The network system further includes a service management system (SMS) 200 which is used to maintain and manage service subscriber's data, and a service control point (SCP) 300 which controls the services.

The remote access management system 100, the service management system 200 and the service control point 300 are provided in a switching station. A subscriber can send a query concerning to available services registered through a service switching point (SSP) 400, which is an exchange, from a telephone terminal 402 to the service control point 300 connected to a common line signal network 401.

An input reception device 102 at the remote access management system 100 receives inputs from the external terminal 101, such as a personal computer owned by the service subscriber. A subscriber informing device 103 sends information to the external terminal 101.

A trial data reception device 104 receives data for trying the services from the external terminal 101. A remote access subscriber database (RAS DB) 120 is data, which correlates the information of the destination to be informed to the service subscriber with the subscriber's data.

An operator performs maintenance and management of a subscriber database 221 from a maintenance-terminal 201 at the service management system 200. An input reception device 202 receives data input from the maintenance-terminal 201. A cyclic starting device 203 starts up an updating device 204 at each set time.

When the updating device 204 informs the contents of the edited subscriber's data to the service control point 300, a subscriber database access device 205 receives the contents of the edited subscriber's data.

If the contents of the edited subscriber's data is stored in the subscriber database 221, the edited result of the subscriber's data is informed to the remote access management system 100 by a RAMS informing device 206.

The trial data received from the remote access management system 100 is transmitted to the service control point 300 by the trial data repeating device 207. SCP load management device 208 receives load information from each service control point 300 and manages a state at each service control point 300. A collection and comparison device 209 collects billing information from the service control point 300 and checks the value.

When an on-line database (DB) 320 included in the service control point 300 is changed through the service switching point 400 and the common line signal network 401 from the telephone terminal 402, a changed part reception device 210 receives the changed contents. The service management system 200 includes an updating history database (DB) 220 which stacks information of the updated subscriber's data and the subscriber database (DB) 221 which stores the subscriber data. The service management system 200 further includes a check condition database (DB) 222 which stores conditions for checking and a billing information database (DB) 223, which store billing information.

In the service control point 300, an access device 301 receives information of the updated subscriber's data from the service management system 200 and updates the on-line database (DB) 320. A load monitor device 302 monitors a state of loading on the service control point 300 based on the number of calls and the usage ratio of CPU.

A changed part transmission device 303 informs information of the part where the data is changed to the service management system 200, when the on-line database 320 is changed by operating from the telephone terminal 402 to inform the changed part.

A service trial device 304 refers the on-line database 320 and provides a service trial for the subscriber. A call processor 305 refers the on-line database 320 and provides the service for the subscriber.

The subscriber's data to be operated are stored in the on-line database 320. When the call processor 305 provides the service, it outputs the billing information to the billing information database 321.

In the present invention, as shown in the structure of FIG. 1, an interface between the remote access management system 100 and the external terminal 101 is provided. When one subscriber sends a request of changing the subscriber's data from the external terminal 101, the request is stacked on the updating history database 220 of the service management system 200.

Then, the contents edited by the service subscriber own is automatically reflected according to the loaded state at the service control point 300, and the result is informed to the external terminal 101.

Therefore, the service subscriber can know when the contents edited by him or her is reflected in the service control point 300. Even when a time gap occurs from the time of editing the subscriber's data to the time of reflecting the edited data in the service control point 300, the subscriber can know the time, similarly to the above-case.

A cycle for reflecting the updated history stacked on the updating history database 220 of the service management system 200 to the service control point 300 is settable from the maintenance terminal 201. The cyclic starting device 203 starts up the updating device 204 in each set cycle. The started updating device 204 reflects the updated history stored in the updating history database 220 in the service control point 300, according to the loaded state of the service control point 300 as described above.

The reflecting cycle can be optionally set so that the cycle can be used for the convenience of the service or the service operation center.

When the subscriber's data is changed from the telephone terminal 402, the changed data is reflected in the subscriber database 221 of the service management system 200. Only when the information of the external terminal 101 is attached to the subscriber's data, the information is informed to the appropriate subscriber through the remote access management system 100 from the service management system 200.

If an illegal access occurs from the telephone terminal 402, therefore, the information of changing data, which is not known by the service subscriber, is sent to the external terminal 101. Then, the service subscriber can find out the illegal access immediately.

When an operator in the switching office edits the subscriber's data from the maintenance terminal 201, the updated history is similarly stacked on the service management system 200. Then, the edited data is automatically reflected according to the status of loading on the service control point 300 and the result is informed to the external terminal 101 at the same time.

Accordingly, the service subscriber can know the edited contents even when the operator in the telephone station edits the subscriber's data.

The service subscriber stores the condition of sending the information set from the external terminal 101 in the service management system 200 and collects information data, such as billing data 321, from the service control point 300.

Every time the data is collected, the collected information is compared with the condition stored in the service management system 200. As far as the condition is fulfilled, the service management system 200 informs the information to the service subscriber through the remote access management system 100.

Then, the service subscriber can receive the information, only when the information fulfills the condition set by him or her, and need not receive useless information. The remote access management system 100 informs the telephone number of the service input from the external terminal 101 through the service management system 200 to the service control point 300. Then, service trial is executed in the service control point 300.

Thereby, the service subscriber can easily find out errors on setting data because he or she can temporally confirm the service for the subscriber data edited by him or her.

The call processing mode, the maximum number of trial times, the number of trial times and the period are added to the subscriber's data. If the subscriber dials up the telephone number of the service from the telephone terminal 402, the service control point 300 judges whether or not the subscriber should be charged and the service can be provided by checking the call processing mode, the maximum number of trial times, the number of trial times and the period.

When the service subscriber dials the telephone number of the service from the telephone terminal 402 to confirm the contents of the edited subscriber's data, the charge is not performed on the subscriber. Even if the subscriber does not join in the service, the subscriber can have an experience on receiving the service by temporally registering the service subscriber's data with a limited period and determine whether he or she joins in the service or not.

Figure 2:
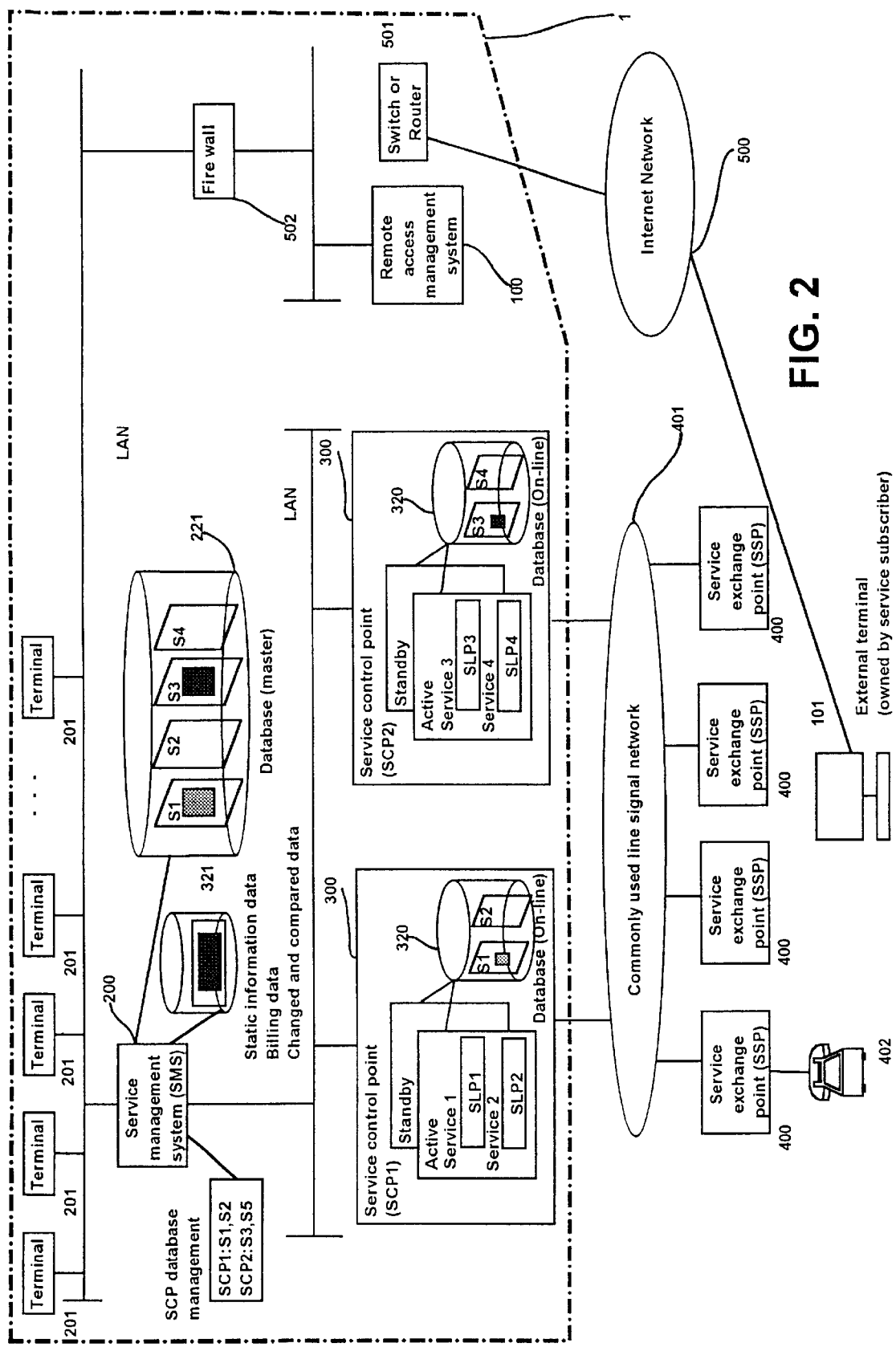
FIG. 2 is a diagram indicating an example of the network system when the subscriber can remotely access to the system according to the present invention by an internet access.

FIG. 2 is a brief diagram indicating one example of the network system, when the subscriber can remotely access to the system according to the present invention through an internet. The service management system 200, the service control points 300 and plural maintenance terminals 201 in a switching office station 1 are connected by a means of LAN.

The plural service control points 300 are provided according to the number of subscribers and the size of the subscriber's data. The telephone terminal 402 of the subscriber is connected to each of the service switching points 400. When the subscriber registers and updates the contents of the services from the telephone terminal 402, the registering and updating request is transmitted through the common line signal network 401 to the service control point 300.

On the contrary, it is a feature of the present invention to transmit the registering and updating request to the remote access management system 100 through an internet 500 and a router 501 in the system of FIG. 2, when the subscriber transmits it through the external terminal 101, such as a personal computer owned by the service subscriber. The request is further transmitted through a firewall 502 to the LAN in the station 1.

Figure 3:
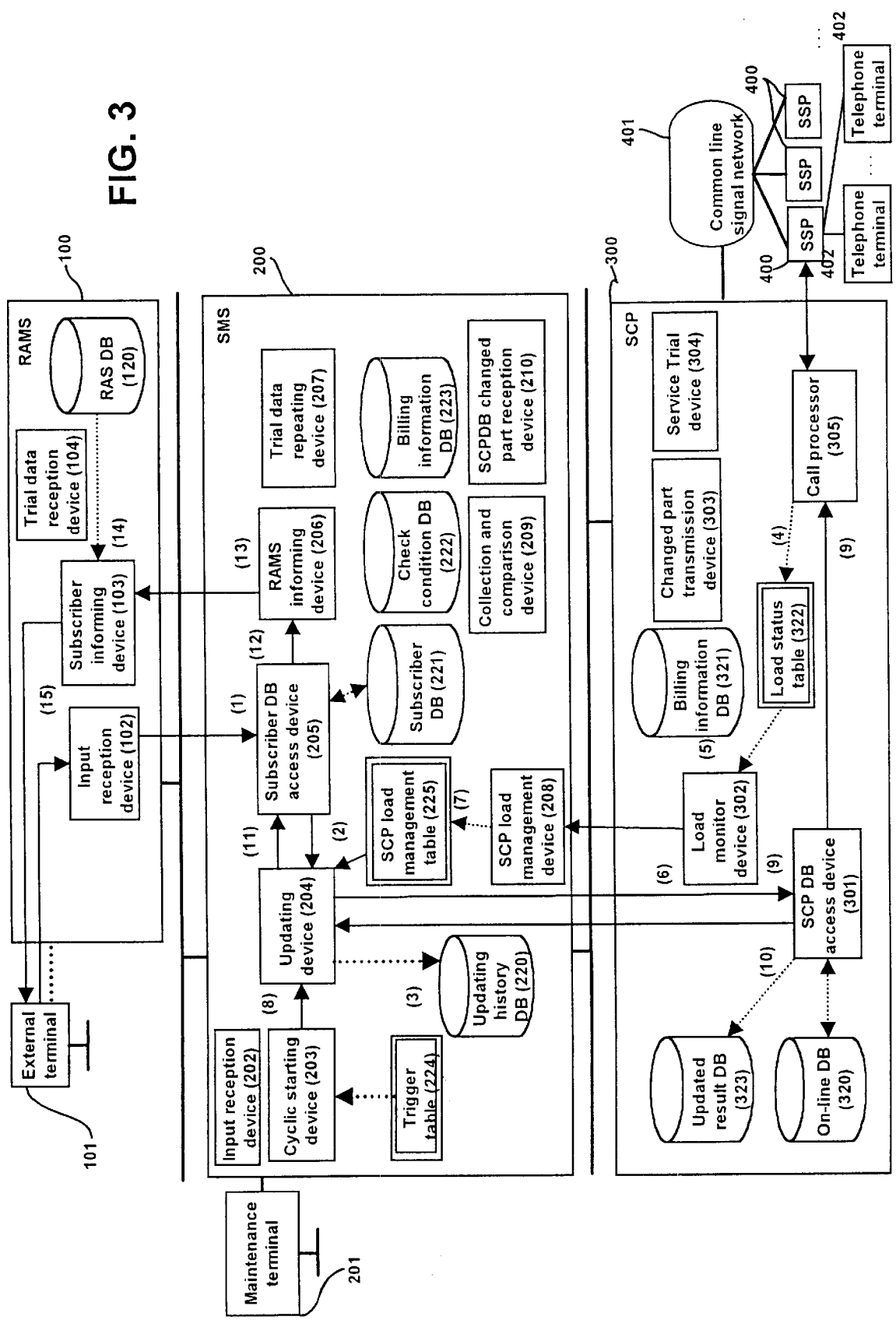
FIG. 3 shows a structure of the first embodiment according to the present invention using the basic structure of FIG. 1.

FIG. 3 is a structural diagram of the first embodiment according to the present invention using the basic structure of FIG. 1. In FIG. 3, numerals in parenthesis denote the numbers of the procedure steps of operational process. Hereinafter, each numeral will be referred as the step number.

The subscriber information input from the external terminal 101 owned by the service subscriber is transmitted to the subscriber database (DB) access device 205 in the service management system 200 through an input reception device 102 of the remote access management system 100 (STEP S1).

When the subscriber database access device 205 receives the subscriber information, it updates the contents of the subscriber database 221. Then, the subscriber database access device 205 transmits the updated information to the updating device 204 (STEP S2). As one example of the subscriber database 221, a table stacking the subscriber information is shown in the following table 1.

TABLE 1

Structure of the subscriber database (221) (XX service)

| Subscriber No #0 | Subscriber ID #0 | Call Processing mode | Maximum number of trial times | Number of trial times | Period | Parameter 1 | Parameter 2 | ... |
|---|---|---|---|---|---|---|---|---|
| Subscriber No #1 | Subscriber ID #1 | Call Processing mode | Maximum number of trial times | Number of trial times | Period | Parameter 1 | Parameter 2 | ... |

The updating device 204 converts the updated information into an updating instruction and stacks it on the updating history database 220 (STEP S3). One example of the updating history database 220 is shown in the following table 2.

TABLE 2

Structure of the updating history database (220)

| Reference No #0 | Type | Subscriber ID | Operation | Name of service | Name of table | Subscriber No | Name of parameter = value | ... |
|---|---|---|---|---|---|---|---|---|
| Reference No #1 | Type | Subscriber ID | Operation | Name of service | Name of table | Subscriber No | Name of parameter = value | ... |

On the other hand, when the call processor 305 at the service control point 300 receives a query from the subscriber's telephone terminal 402 through the service switching point 400, which is an exchange, a counter in the loading state table 322 counts up the number of calls (STEP S4). Then, the service is executed through the telephone and the result is transmitted to the service switching point 400. One example of the contents in the load status table 322 is shown in the following table 3.

TABLE 3

Structure of load status table (322)
Load level

| Counter of counting the number of calls | Upper value of the number of calls | Lower value of the number of calls |
|---|---|---|
| CPU usage rate | CPU upper value | CPU lower value |
| Resource usage rate | Resource upper value | Resource lower value |

A load monitor device 302 has the same structure as that of a load monitor and control section, which is described in the Japanese patent laid-open application No. 9-8907 titled by "Load limit control system for central management control network". The load monitor device 302 refers the load state table 322 in each constant cycle (STEP S5) and calculates the load level. A counter of countering the number of calls, the CPU usage rate and the resource usage rate are required as elements for obtaining the load level. The load level is obtained based on the upper or lower value of each element. When one element becomes more than the upper value, the load level is increased, and when all elements become lower than the lower value, the load level is decreased.

The load monitor device 302 informs the load level to a SCP load management device 208 in the service management system 200, when the load level is changed (STEP S6). The SCP load management device 208 stores the load level in the SCP load management table 225 (STEP S7). One example of the contents in the SCP load management table 225 is shown in the following table 4.

TABLE 4

Structure of the SCP load management table (225)
Entire state

| SCP name | Individual status | Load level | Updated and sustained load level | Updated and restarted load level |
|---|---|---|---|---|
| #0 | | | | |
| SCP name #1 | Individual status | Load level | Updated and sustained load level | Updated and restarted load level |

When the load level is more than the updated and sustained level, the individual status is changed to a non-updatable status. On the other hand, when the load level is less than the updated and restarted load level, the individual status is changed to an updatable status.

When the non-updatable status is included in the individual statuses of the SCP load management table 225 at the plural service control points 300, after that, the entire status is changed to the non-updatable status. On the contrary, when the updatable status is not included in all of the individual statuses, the entire status is changed to the updatable status. The cyclic starting device 203 in the service management system 200 refers a trigger table 224 in each cycle. The cyclic starting device 203 judges whether the execution time is over according to the reference. When the execution time is over, the cyclic starting device 203 requests the updating device 204 to update the on-line database 320 at the service control point 300 (STEP S8).

The above-described trigger table 224 has a structure having a start time and a start command of the updating device. When the data of the start time of the updating device is set to "3, 18, 33, 48, 1–2", as one example, it means the updating process is executed in every fifteen minutes from one to two. In this case, the updating device is started up at one three, one eighteen, one thirty-three and one forty-eight.

When the updating device 204 finds the entire status at an updatable status by referring the table 225, it transmits the data stacked on the updating history database 220 to the service control point database (SCPDB) access device 301 at each service control point 300 (STEP S9). Alternatively, when the entire status is at a non-updatable status, the next updating request is waited.

The SCPDB access device 301 at the service control point 300 updates the on-line database 320 based on the data of the updating history database 220. The SCPDB access device 301 stores the updated result in the updated result database 323 and transmits the result to the updating device 204 (STEP S10). The structure of the updated result database 323 is shown in the following table 5.

TABLE 5

Structure of the updated result database (323)

| Reference No #0 | Updated result | Additional information |
|---|---|---|
| Reference No #1 | Updated result | Additional information |

The updating device 204 retrieves the data in the updating history database 220 based on the reference number in the updated result database 323. The updating device 204 creates operated result information 226 shown in the following table 6 based on the retrieved result and informs the result to the subscriber database access device 205, which is a master database (STEP S11).

TABLE 6

Structure of the operated result information (226)

| Type | Subscriber ID | Subscriber No | Telephone terminal No | Oper- ation | Updated result | Additional information |
|---|---|---|---|---|---|---|
| Type | Subscriber ID | Subscriber No | Telephone terminal No | Oper- ation | Updated result | Additional information |

When the type in the operated result information is "Subscriber", the subscriber database access device 205 informs the operated result information to the remote access management system (RAMS) informing device 206 (STEP S12).

Therefore, the RAMS informing device 206 informs the operated result information to the subscriber-informing device 103 in the remote access management system 100 (STEP S13). The subscriber informing device 103 retrieves the data stacked on the remote access subscriber database 120, as shown in the following table 7, based on the information of the subscriber requesting the change and obtains an informing method (route) and the destination, such as an address.

TABLE 7

Structure of the remote access subscriber database (120)

| Subscriber ID #0 | Informing method | Destination | ... |
|---|---|---|---|
| Subscriber ID #1 | Informing method | Destination | ... |

When the informing method is "External device 101" in the above table 7, for example, a mail address is set as the destination.

When the informing method is "External device 101", the subscriber informing device 103 transmits the updated result to the mail address of the destination.

Figure 4:
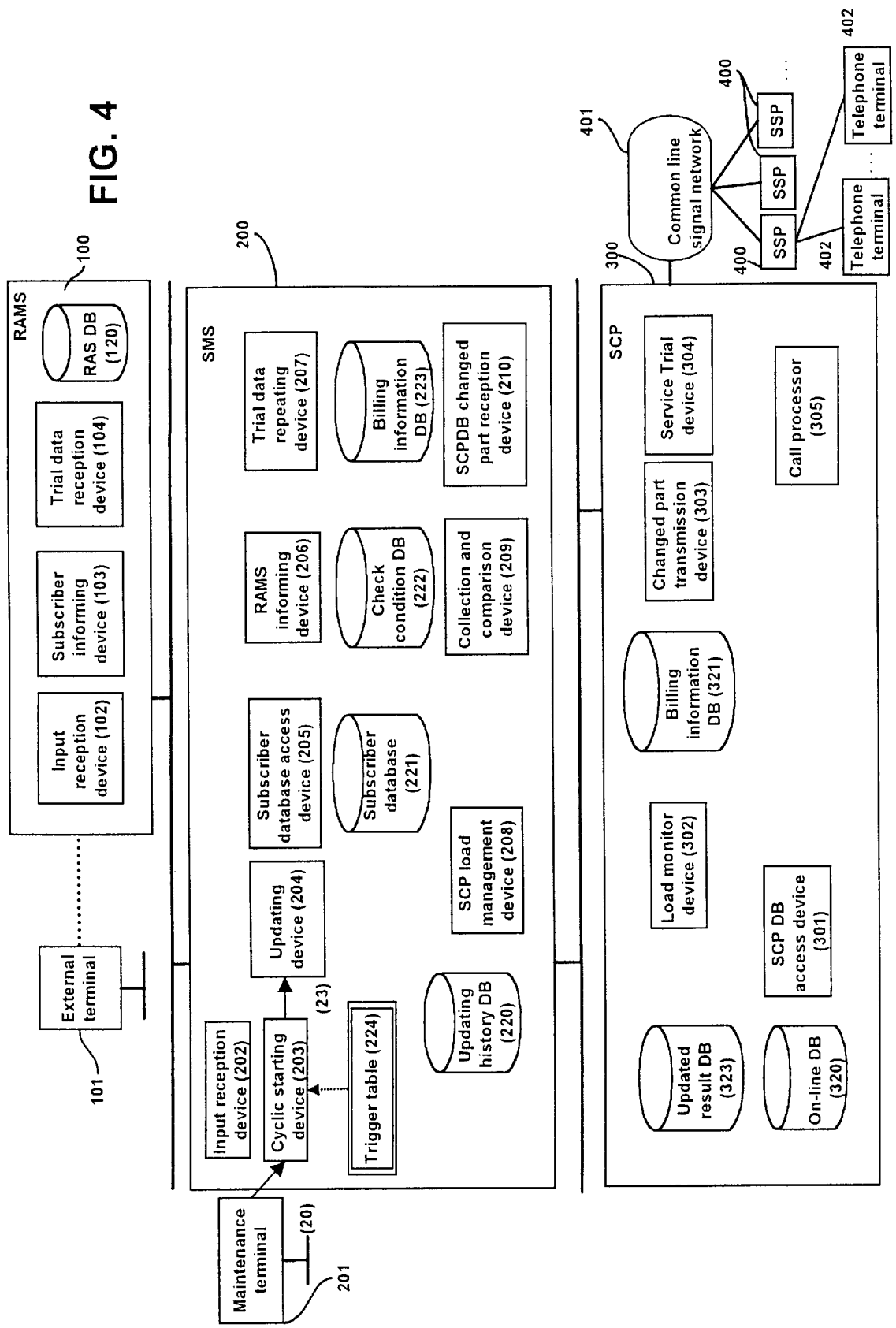
FIG. 4 shows a second embodiment according to the present invention using the structure of FIG. 1.
Figure 5:
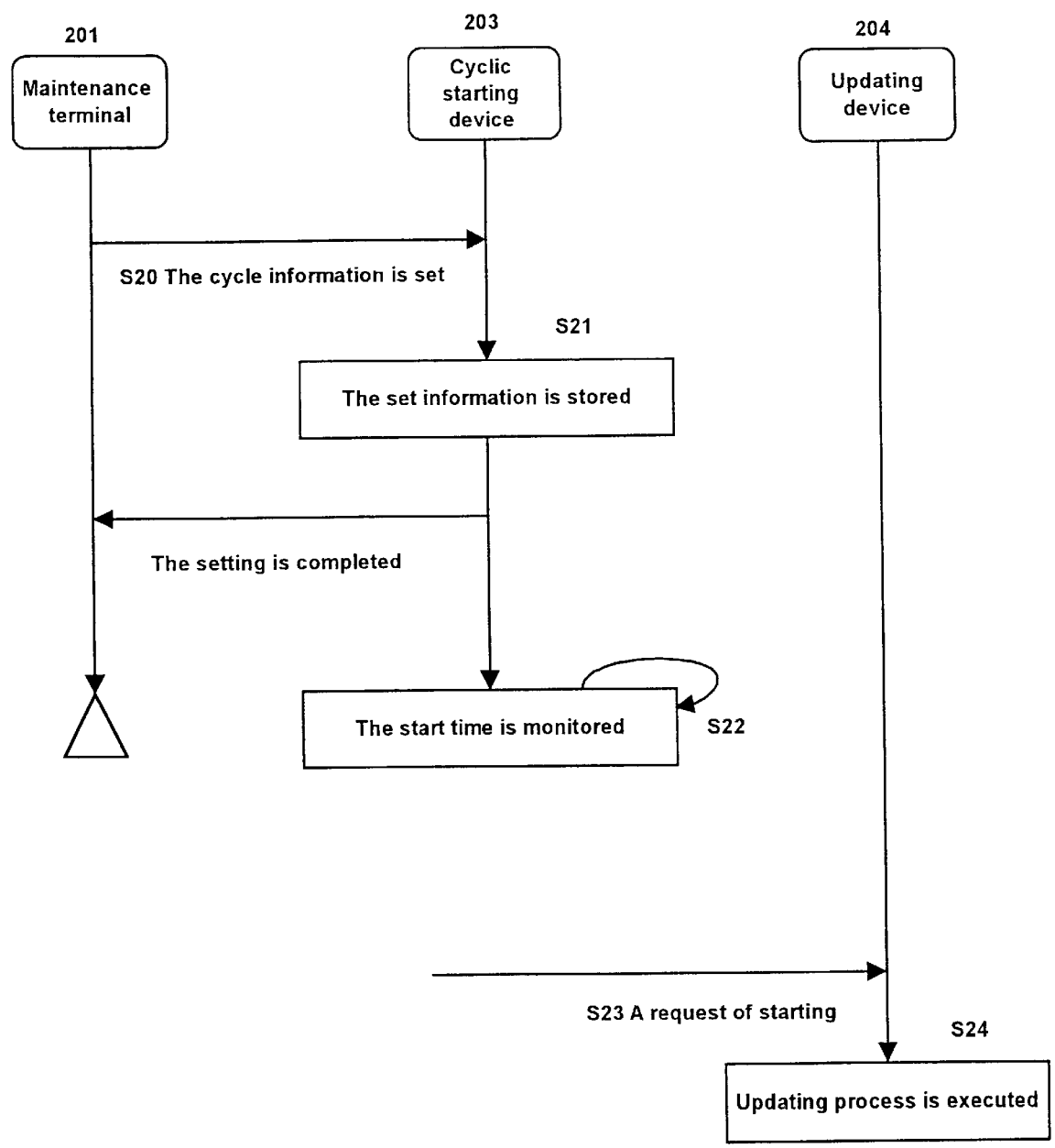
FIG. 5 is an operational explanation flowchart of the second embodiment shown in FIG. 4.

FIG. 4 shows a second embodiment of the present invention in the structure shown in FIG. 1. FIG. 5 is an operational flowchart of the embodiment shown in FIG. 4. In the second embodiment, the updating cycle is set by the maintenance terminal 201 and the cyclic starting device 203. The updating information transmitted from the maintenance terminal 201 is edited.

FIGS. 6A, 6B and 6C show examples of screens for registering the updating cyclic information. The operator sets the updating cycle according to instructions on screens shown in FIGS. 6A, 6B and 6C, each of which is displayed on the maintenance terminal 201 (STEP S20).

The information set on the screen for registration is shown as one example as follows. In the example shown in FIG. 6A, 5, 10, 15, 20, 30 minutes or one hour is settable as a cycle of executing the updating process.

All hours or between 0 to 23 can be set in each one hour as a time of executing the cyclic process. FIG. 6B shows a screen of setting a start time of the cyclic process, and FIG. 6C shows one example of screens of setting an end time of the cyclic process. The cyclic starting device 203 stores the set information input from the maintenance terminal 201 to a trigger table 224 (STEP S21). One example of the stored information will be now explained.

The stored information includes a command of starting up the updating device 204 (a command image for starting up the updating device 204) and a start time of the updating device 204.

In addition, in the second embodiment, the cyclic starting device 203 refers the information on the trigger table 224 and starts up the updating device 204.

The cyclic starting device 203 monitors the start time of the updating cyclic process to be set. The cyclic starting device 203 always monitors the information of the start time of the updating device 203 stored on the trigger table 224 (STEP S22).

The cyclic starting device 203 requests the updating device 204 to start the updating process. In other words, a command of starting the updating device 204 is executed in each start time of the updating device stored in the trigger table 224 as described above (STEP S23). Thereby, a cycle of updating process or the cyclic start is performed (STEP S24).

FIG. 7 is a diagram of explaining another embodiment according to the present invention. FIGS. 8 to 10 are flowcharts for explaining operations in the structure of FIG. 7. FIG. 8 is an operational flowchart of the service control point 300, FIG. 9 is an operational flowchart of the service management system 200 and FIG. 10 is an operational flowchart of the remote access management system 100.

In this embodiment, one example is shown that a subscriber changes his or her personal identification number through his or her telephone terminal 402. The subscriber inputs an access code for changing the personal identification number through the telephone terminal 402. Then, a request of changing the subscriber information is transmitted from the telephone terminal 402 to the call processor 305 at the service control point 300 (STEP S30).

The call processor 305 requests to read out the subscriber information for the SCPDB access device 301 (STEP S31). Based on the subscriber information of the on-line database 320 read out through the SCPDB access device 301 (STEP S32), the call processor 305 instructs the telephone terminal 402 to execute a procedure of changing the subscriber information (STEP S33).

In response to the instruction, the subscriber inputs a credit card number (STEP S34) and he or she inputs the personal identification number after that. The call processor 305 verifies a match between the credit card number and the personal identification number (STEP S35). When the subscriber changes the personal identification number, he or she inputs new personal identification number. For reconfirmation, the subscriber should input the new personal identification number again (STEP S36).

The call processor 305 transmits the contents of the changed subscriber information that is input from the telephone terminal 402 to the SCPDB access device 301 as a request of writing the changed subscriber information (STEP S37). In response to the request, the SCPDB access device 301 writes the subscriber information to the on-line database 320 (STEP S38). The SCPDB access device 301 informs the writing completion to the call processor 305 (STEP S39) and to the telephone terminal 402 (STEP S40).

At the same time, the SCPDB access device 301 informs the changed contents in the on-line database 320 to the changed part transmission device 303 (STEP S41). The changed part transmission device 303 informs the changed part to a SCPDB changed part reception device 210 at the service management system 200 (STEP S42).

In reference to FIG. 9, the SCPDB changed part reception device 210 transmits a request of changing the subscriber data to the subscriber database access device 205 (STEP S43). The subscriber database access device 205 writes the changed contents to the subscriber database 221 and reflects the changed contents (STEP S44).

In here, the subscriber database access device 205 obtains a subscriber identifier for informing the subscriber to be informed (STEP S45). When the subscriber has the subscriber identifier, the subscriber database access device 205 informs the subscriber identifier, the subscriber number, the updated result, the updated contents and the number of telephone terminal where the subscriber has executed the updating process (STEP S46) to the RAMS informing device.

Then, the RAMS informing device 206 informs the subscriber identifier, the subscriber number, the updated result, the updated contents, the number of telephone terminal the subscriber has executed the updating process to the subscriber informing device 103 at the remote access management system 100 (refer to FIG. 10).

In FIG. 10, the subscriber informing device 103 obtains the informing method (route) and the destination, such as a mail address, from the remote access management database (RAM DB) 120, based on the subscriber identifier informed from the RAMS informing device 206 and checks them (STEP S48). When the informing method is "External terminal", then, the changed contents are informed from the informing-device 103 to the external terminal 101 (STEP S49).

Returning back to FIG. 9, the subscriber database access device 205 informs the changed contents to the updating device 204 at the same time of informing to the RAMS informing device 206 (STEP S50).

When plural service control points 300 are connected, the updating device 204 informs the changed contents to the SCPDB access devices 301 at the service control points 300 other than the point where the request of changing the contents is transmitted. Each SCPDB access device 301 to be informed writes the changed contents to each on-line database 320 and reflects the subscriber data to be informed (STEP S52).

If the updating device 204 cannot inform the changed contents to each service control point because of a failure occurred on a LAN, it temporally accumulates the changed contents in the updating history database 220 (STEP S53).

FIG. 11 further shows still another embodiment according to the present invention in the case when one operator in a telephone station updates the subscriber database, for example. The operator inputs information required for updating the subscriber database from the maintenance terminal 201, and an input reception device 202 receives the input contents (STEP S60).

The input reception device 202 informs the contents input from the maintenance terminal 201 to the subscriber database access device 205 (STEP S61). When the subscriber database access device 205 receives an instruction of updating the subscriber database 221, it updates the subscriber database 221 according to the contents input from the maintenance terminal 201. Then, the subscriber database access device 205 transmits the updated contents to the updating device 204 (STEP S62). The updating device 204 accumulates the updated contents in the updating history database 220 at the same time.

As is explained in the basic structure of FIG. 1, the cyclic starting device 203 informs that the SCPDB is updated to the updating device 204 (STEP S63). The updating device 204 transmits the contents stacked on the updating history database 220 to the SCPDB access device 301 at each service control point 300 (STEP S64).

The SCPDB access device 301 updates the on-line database 320 based on the contents stacked on the updating history database 220. After completion of updating the on-line database 320, the SCPDB access device 301 transmits the updated contents stored in the updated result database 323 to the updating device 204 at the service management system 200 (STEP S65).

The updating device 204 extracts the subscriber number; the updated result; and the updated contents concerning to the information, of which "type" is updated by the operator, from the updated result database 323 and the updating history database 220 and informs them to the subscriber database access device 205 (STEP S66).

The subscriber database access device 205, which receives the information, extracts the coincident subscriber name from the subscriber database 221 according to the subscriber number and informs the subscriber name; the subscriber number; the updated result; and the updated contents; to the RAMS informing device 206 (STEP S67).

The RAMS informing device 206 informs the subscriber name; the subscriber number; the updated result; and the updated contents to the subscriber informing device 103 (STEP S68).

The subscriber informing device 103 retrieves the informing method (route) and the destination (address) from the remote access subscriber database 120, according to the subscriber name, and informs them to the subscriber according to the retrieved result (STEP S69).

FIG. 12 shows a further embodiment according to the present invention. The structure includes mechanisms of setting a condition when the service subscriber receives the information and of collecting and comparing the billing information and informing the information to the external terminal owned by the service subscriber.

The service subscriber inputs a condition of receiving the information from the external terminal 101, and the input reception device 102 receives the contents (STEP S70). The input reception device 102 informs the contents received from the input of the service subscriber to the subscriber database access device 205 (STEP S71). The subscriber database access device 205, which receives the information, stores the contents in a check condition database 222 (STEP S72). A structure of the check condition database 222 is shown in the following table 8.

TABLE 8

A structure of the checking condition database (222)

| Subscriber number | Subscriber ID | Check information | Checking conditional expression |
|---|---|---|---|
| Subscriber number | Subscriber ID | Check information | Checking conditional expression |

On the other hand, when the call processor 305 executes an exchanging service through the commonly used line signal network 401 from the telephone terminal 402, the billing information is stored in a billing information database 321 in the service control point 300 (STEP S73). One example of structure of the billing information data 321 is shown in the following table 9.

TABLE 9

A structure of the billing information database (321)

| Subscriber number | Charge ($) |
|---|---|
| Subscriber number | Charge ($) |

The information stacked on the billing information database 321 at the service control point 300 is collected by the collection and comparison device 209 in the service management system 200 (STEP S74) and is stored in the billing information database 223 at the service management system 200 (STEP S75). One example of a structure of the billing information database 223 is shown in the following table 10.

TABLE 10

A structure of the billing information database (223)

| Subscriber number | Total charge ($) |
|---|---|
| Subscriber number | Total charge ($) |

The collection and comparison device 209 checks in reference to the check condition database 222 and the billing information database 223 at the service management system 200. If the check condition is fulfilled, the checked result is informed to the subscriber database access device 205 (STEP S76).

The subscriber database access device 205, which receives the checked result from the collection and comparison device 209, informs the checked result to the RAMS informing device 206 (STEP S77). The RAMS informing device 206, which receives the checked result from the subscriber database access device 205, subsequently informs the checked result to the subscriber informing device 103 (STEP S78).

The subscriber informing device 103, which receives the checked result from the RAMS informing device 206, refers the remote access management database 120 and retrieves the information of the service subscriber to inform the checked result (STEP S79). The subscriber informing device 103 informs the checked result to the external terminal 101 owned by the service subscriber, based on the retrieved information of the service subscriber (STEP S80).

FIG. 13 shows a still further embodiment according to the present invention. The trial data reception device 104, a trial data repeating device 207, a service trial device 304 are respectively provided on the remote access management system 100, the service management system 200 and the service control point 300 to try the service from the external terminal 101.

One example of information to be requested and to be input by employing a network from the external terminal 101, hereinafter, it calls service trial information, is shown in FIG. 14. The service trial information is transmitted to the trial data repeating device 207 in the service management system 200 through the trial data reception device 104 in the remote access management system 100 (STEP S81).

The trial data repeating device 207 judges a host address of the service trial device 304 according to the service trial information requested from the external terminal 101 and requests the service imitation (STEP S82). The host address is obtained by employing the name of the service trial information and the host information table 227 from the message mechanism shown in FIG. 14. One example of the contents in the host information table 227 is shown in the following table 11.

TABLE 11

Structure of the host information table (227)

| Host address 1 | Host name 1 | Service name 1 | ... | Service name n |
|---|---|---|---|---|
| Host address 2 | Host name 2 | Service name 1 | ... | Service name n |

The service trial information is transmitted to the service trial device 304 on the obtained host address in this way to request trying the service (STEP S82). The service trial device 304 analyzes the service trial information, accesses to the on-line database 320 through the SCPDB access device 301 as well as the normal service, and controls the service (STEP S83).

Next, the SCPDB access device 301 informs the result of accessing to the on-line database 320 to the service trial device 304 (STEP S84).

The service trial device 304 informs the compared result as well as the normal service to the trial data repeating device 207, based on the result of accessing to the on-line database 320 (STEP S85).

The trial data-repeating device 207 informs the result transmitted from the service trial device 304 to the trial data reception device (STEP S86).

Hereinafter, a flow of subscriber's operation due to the above trial information will be now explained, employing an abbreviated dialing service as one example.

The external terminal 101 registers the subscriber data shown in the above table 1. Then, the parameter 1 means an abbreviated number and the parameter 2 means a number to be changed. The contents for registration are the subscriber number "12345678", the abbreviated number "*01", and the number to be changed "71241234", for example.

A method of trying the service will be now explained in reference to FIG. 15, which illustrates a sequential flowchart as an operation of the embodiment shown in FIG. 13. The external terminal 101 requests to try the abbreviated dialing service (STEP S800). The trial data reception device 105 is started up to indicate a message "Input your subscriber number" on the screen of the external terminal 101 (STEP S801).

The subscriber inputs the subscriber number "1234567" according to the message indication on the screen (STEP S802). The trial data reception device 104 sets the subscriber number to an expanded section (refer to FIG. 14) included in a message structure of the service trial information and transmits it to the trial data repeating device 207 (STEP S81).

The trial data-repeating device 207 detects the contents of the service and informs the contents to the service trial device 304 (STEP S82).

The service trial device 304 detects the service according to the service trial information (STEP S803). The service trial device 304 requests the SCPDB access device 301 to access the database (STEP S83) and receives the information of the result of accessing the database from the SCPDB access device 301 (STEP S84), for example.

Subsequently, the service trial device 304 receives the information relating to the result of accessing the database from the SCPDB access device 301, sets the result of the service to the expanded section, which is included in a message structure of the service trial information shown in FIG. 14, and returns the result to the trial data reception device 104 through the trial data repeating device 207 (STEPs S85 and S86).

The trial data reception device 104 judges the result and displays a message corresponding to the service on the screen of the external terminal 101.

When the abbreviated dialing service is employed, the service trial device 304 judges whether or not the subscriber number input from the external terminal 101 is registered in the on-line database 320. When it is registered, the service trial device 304 checks each parameter and returns a request of inputting the abbreviated number as the result, if there is no problem on the contents as data for the service (STEP S804).

When the subscriber correctly inputs the subscriber number, a message "Input your abbreviated number "ABBR"" is displayed on the screen of the external terminal 101. Then, the subscriber inputs the abbreviated number "*01" (STEP S805).

The trial data reception device 204 sets the input abbreviated number to the expanded section, which is included in the structure of the message of the service trial information, and informs it to the service trial device 304 through the trial data repeating device 207 (STEPS S81' and S82').

The service trial device 304 detects the service (a request of comparing the abbreviated number) from the service trial information (STEP S803'). A request of accessing the database is performed to the SCPDB access device 301 according to the result on detecting the service (STEP S83'), and the information of the result on accessing the database is received from the SCPDB access device 301 (STEP S84'), for example.

Then, the result is set to the expanded section, which is included in the structure of the message of the service trial information and is returned to the trial data reception device 104 through the trial data repeating device 207 (STEPS S85' and S86').

The trial data reception device 104 judges the result and displays a corresponding message of the result on the screen of the external terminal 101 (STEP S806). When the abbreviated dialing service is employed, the service trial device 304 judges whether or not the abbreviated number input from the external terminal 101 is registered in the on-line database 320. When it is registered, the service trial device 304 checks each parameter and returns a request of displaying the changed number as the result, if there is no problem on the contents of data for the service. If the subscriber correctly inputs the abbreviated number, a message "the abbreviated number *01 is changed to "71241234" is displayed on the screen of the external terminal 101 (STEP S58).

When the trial of the abbreviated dialing service is employed, the subscriber confirms that the number is changed to the new number "71241234" by inputting the abbreviated number *01. The subscriber can easily confirm the contents registered by him or her by employing a function of trying the service described above.

Then, the trial data reception device 104 transmits information of a process completion to the trial data repeating device 207 and the service trial device 304 through the trial data repeating device 207, and the process is completed here (STEPS S807 and S808).

FIG. 16 is an explanatory diagram, when the subscriber data is edited in the first basic structure. FIG. 17 is an operational flowchart corresponding to FIG. 16. In this example, the subscriber data to be edited is at a call-processing mode shown in the above table 1.

The subscriber dials through the telephone terminal 402 (STEP S90) and accesses the call processor 305 through the service switching point 400 and the common line signal network 401 (STEP S91). When the service is provided, the call processor 305 reads out the on-line database 320 from the SCPDB access device 301 and refers the call processing mode of the service for the subscriber data (STEP S92). The corresponding call processing service is executed in each call-processing mode (STEP S93).

When the call processing mode is "0", a normal call processing is performed. In the other words, the billing process (STEP S94) and the corresponding service are performed (STEP S95). When the call processing mode is "1", the maximum number of trial times and the number of trial times are read out (STEP S96) and they are compared (STEP S97).

If the number of trial times is more than the maximum number of trial times, the service is suspended (STEP S970). When the number of trial times is less than the maximum number of trial times, the normal call process (STEP S95) except the billing process (STEP S94) is performed (STEP S971). Additionally, one is counted up to the number of trial times and the above-described process is repeated.

When the call processing mode is "2", the period shown in the table 1 is read out (STEP S98) and the read out period is compared with the current date (STEP S99). When the current date is beyond the period, the call processing service is suspended (STEP S980). When the current date is within the period, the normal call processing expect the billing process (STEP S94) is performed (STEP S981).

The operator of the service operation center sets an initial value set from the maintenance terminal 201 as the maximum number of trial times. "0" is set to the number of trial times as a default value. A date when the call processing mode is set to "2" in addition to α is set as the period. The α can be optionally set by the operator of the service operation center.

As described above, according to the present invention, in the intelligent network system, a service subscriber can remotely perform a procedure of registering a service and changing contents of the services, which should be performed by an operator in the conventional system, through an external terminal by the subscriber himself.

In the present invention, the service registration and change performed by the service subscriber becomes effective at last by reflecting the data to an on-line database included in a service control point, however, the reflection is dynamically performed through the service management system.

In the present invention, automatic data reflection can be performed according to a status of the system because the system has a load monitoring function. At the same time, it is possible to set a period of the reflection by the service operation center because the system has function of setting the reflection period.

The subscriber can understand from when the own request becomes effective because the subscriber directly informs the request relating to the result of the automatic reflection. Besides, the notifications of information is performed every time the subscriber changes the contents of registration from the telephone terminal, when the operator changes the content of registration, or when the service subscriber uses the services over a prescribed condition. Therefore, according to the present invention, the service subscriber can always hold the own registered contents and the status of receiving the services.

Moreover, in the present invention, it becomes possible to check data on the on-line database by imitating the service from the external terminal or the telephone terminal. Therefore, the service subscriber can have a trying experience of operating the service and confirm to match with the registered and changed contents performed by him or her at the same time according to the present invention. As is explained, according to the present invention, it becomes possible to register, add and change the service by the service subscriber and to manage the service execution status impossible in the conventional system.

The invention may be embodied in other specific forms without departing from the sprit or essential characteristics thereof.

The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. An intelligent network system comprising:
    a service control point having a database storing data relating to subscribers and controlling services to be provided to the subscribers;
    a service management system controlling load on the service control point, and maintaining the data relating to the subscribers;
    external terminals owned by the subscribers; and
    a remote access management system connecting the service management system to the external terminals via an internet connection,
    wherein the service management system updates the database in the service control point with data of the subscribers, transmitted through the remote access management system from external terminals, when the service control point is not over loaded, and wherein the service control point monitors load on the database and communicates the load level on the database to the service management system, the service management system blocking updates to the database when an excessive load on the database exists.

2. The intelligent network system according to claim 1, wherein the service management system includes a means for setting cyclic information for updating the database in the service control point, and updates the database, according to the set cyclic information when the service control point is not over loaded, the cyclic information determining periods of timings for updating the database.

3. The intelligent network system according to claim 2, wherein the cyclic information for updating the database is set by a system operator from a maintenance terminal connected to the service management system.

4. The intelligent network system according to claim 1, wherein the service management system includes means for informing the updated result in the database of the service control point to an appropriate external terminal owned by a corresponding subscriber through the remote access management system.

5. The intelligent network system according to claim 1, further comprising:
    a telephone terminal connected through a common line signal network to the service control point,
    wherein, when the telephone terminal updates the database in the service control point, the service management system transmits the updated data by the telephone terminal to a corresponding external terminal owned by the subscriber through the remote access management system.

6. The intelligent network according to claim 1, wherein plural subscriber control points are provided according to the number of subscribers.

7. An intelligent network system comprising:
    a service control point having a database storing data relating to subscribers and controlling services to be provided to the subscribers;
    a service management system monitoring load on the service control point, and maintaining the data relating to the subscribers;
    external terminals owned by the subscribers; and
    a remote access management system connecting the service management system to the external terminals via an internet connection,
    wherein the service management system updates the database in the service control point with data of the subscribers, transmitted through the remote access management system from external terminals, when the service control point is not over loaded,
    wherein the remote access management system includes a trial data reception means;
    the service management system includes a trial data repeating device; and
    the service control point includes a service trial device, and
    wherein the trial data reception means receives a request of trying services for the subscribers from an external terminal, executes the services corresponding to the request of trying the services from the service trial device in the service control point and informs the result of executing the services through the trial data repeating device to the external terminal of the subscribers.

8. The intelligent network system according to claim 1, wherein the subscriber sets conditions of informing static information and billing information collected, when a service is executed, as updated data for the subscribers, and the service management system informs the static information and the billing information according to the set conditions.

9. The intelligent network system according to claim 5, wherein the service management system controls not to charge for services given to the subscribers, which are requested through the telephone terminal.

10. A service data updating method in an intelligent network system comprising the steps of:

outputting updated data for a service requested from a subscriber through an external terminal;

recording a status of loading on a service control point by a service management system;

updating a database in the service control point with data of the subscribers, transmitted from the external terminal, when the service control point is not over loaded;

the service control point monitoring load on the database, and communicating the load level on the database to the service management system, the service management system blocking updates to the database when an excessive load on the database exists.

11. The service data updating method according to claim 10, further comprising the steps of:

setting cyclic information for updating the database in the service control point; and updating the database according to the set cyclic information.

12. The service data updating method according to claim 11, wherein the cyclic information for updating the database is set by a system operator from a maintenance terminal connected to the service management system.

13. The service data updating method according to claim 10, wherein the service management system informs the result of updating the database in the service control point through a remote access management system to the external terminal owned by the subscriber.

14. The service data updating method according to claim 10, wherein the subscriber sets conditions of informing static information and billing information collected at the time of executing the service for the subscriber and the service management system informs the static information and billing information according to the set conditions.

15. The service updating method according to claim 10, wherein the service management system controls not to charge for services given to the subscribers, which are requested through the telephone terminal.

* * * * *